Sept. 24, 1957 J. R. LONGSTREET 2,807,052
DRIVE SHAFT AND SHEAR COUPLING
Filed April 5, 1955 3 Sheets-Sheet 1

INVENTOR.
JAMES R. LONGSTREET
BY Hudson, Boughton,
Williams, David & Hoffmann
ATTORNEYS Sept. 24, 1957   J. R. LONGSTREET   2,807,052
DRIVE SHAFT AND SHEAR COUPLING
Filed April 5, 1955   3 Sheets-Sheet 2

INVENTOR.
JAMES R. LONGSTREET
BY
ATTORNEYS

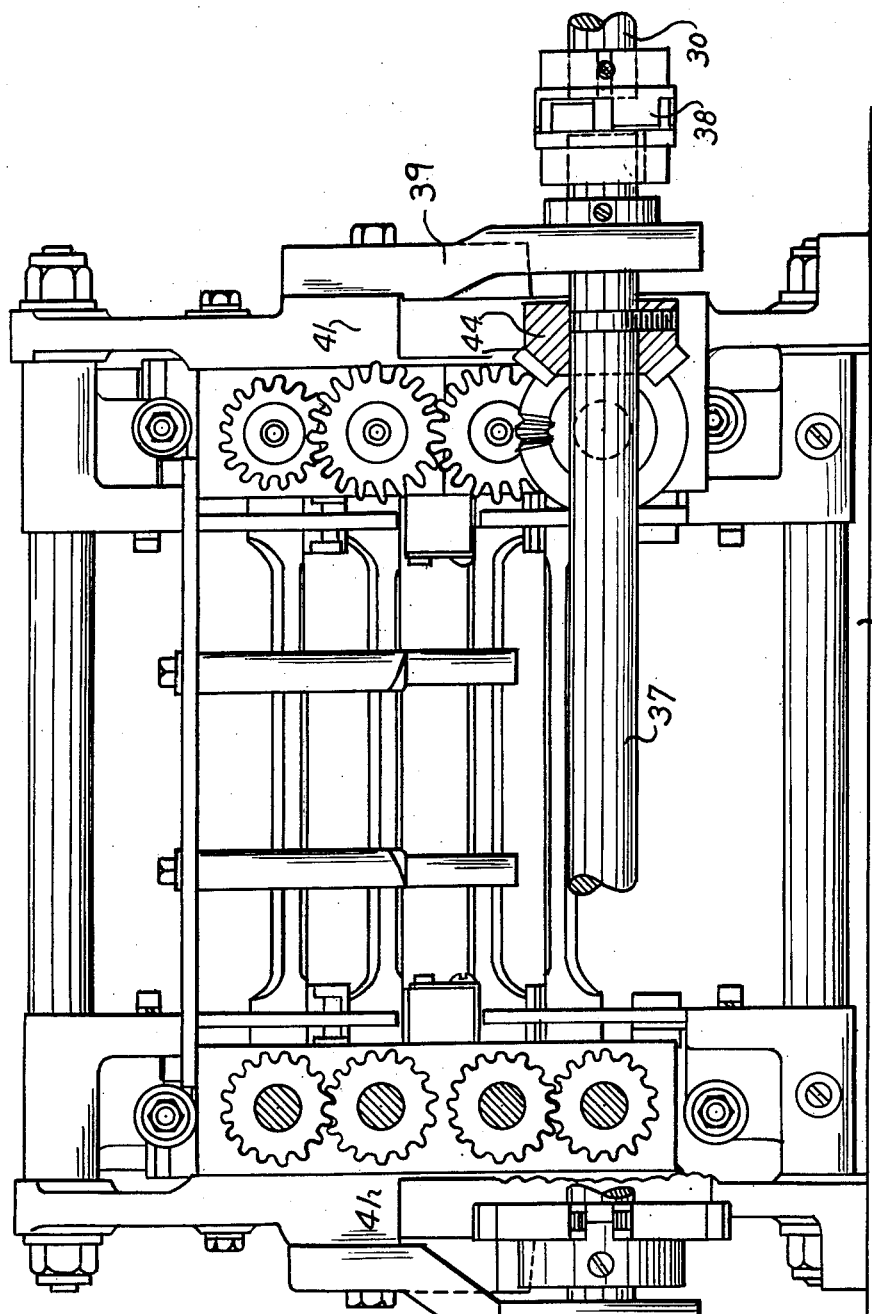

United States Patent Office 2,807,052
Patented Sept. 24, 1957

2,807,052

DRIVE SHAFT AND SHEAR COUPLING

James R. Longstreet, Bedford, Ohio, assignor to The Warner & Swasey Company, Cleveland, Ohio, a corporation of Ohio Application April 5, 1955, Serial No. 499,403

8 Claims. (Cl. 19—129)

This invention relates to an improvement in gill boxes and will be described herein in connection with gill boxes of the type wherein the faller bars have rectilinear motion imparted thereto by actuating screws, but it will be understood that the invention may be applicable to other types of gill boxes.

An object of the invention is to provide a gill box construction wherein the manufacture and assembly of the actuating drive for the cross shaft of the gill box is simplified and facilitated and wherein the support and assembly of the cross shaft in the gill box is simplified inasmuch as the actuating drive constitutes a unit separately manufactured and assembled and the faller bar section of the gill box with the cross shaft another separately manufactured and assembled unit.

Another object of the invention is to provide a unit which is readily secured to or removed from the gill box structure and which contains the gear train drive from the motor to the cross shaft of the faller bar section and includes a cross shaft extension shaft forming part of the unit and readily coupled to or uncoupled from the cross shaft.

Another object is to provide in a gill box such as referred to in the last named object a shear coupling operatively interconnecting the gear train drive with the cross shaft extension shaft of the unit and located exteriorly of the unit in a position readily accessible to the operator, it being understood that by shear coupling is meant a coupling which will shear or uncouple under over-loads and consequently will prevent damage to other operative parts of the gill box in the event of overloads.

A further object is to provide in a gill box means for supporting the cross shaft of the faller bar section of the gill box and which means are secured to the side frames of the faller bar section of the gill box, wherefore the cross shaft and its supporting means form with the faller bar section frame a unit which can be separately manufactured and assembled as distinguished from having the cross shaft supported by means carried by the platen or base of the gill box.

Further and additional objects and advantages not hereinbefore specified will become apparent hereinafter during a detailed description of an embodiment of the invention which is to follow and which embodiment is illustrated in the accompanying drawings forming part of this specification and wherein, Fig. 1 is a side elevational view of the gill box embodying the present invention with the cover for the drive motor, the belt and pulley drive therefrom to the gear train drive unit and the shear coupling on the exterior of the gear train drive unit shown in section.

Figure 1:
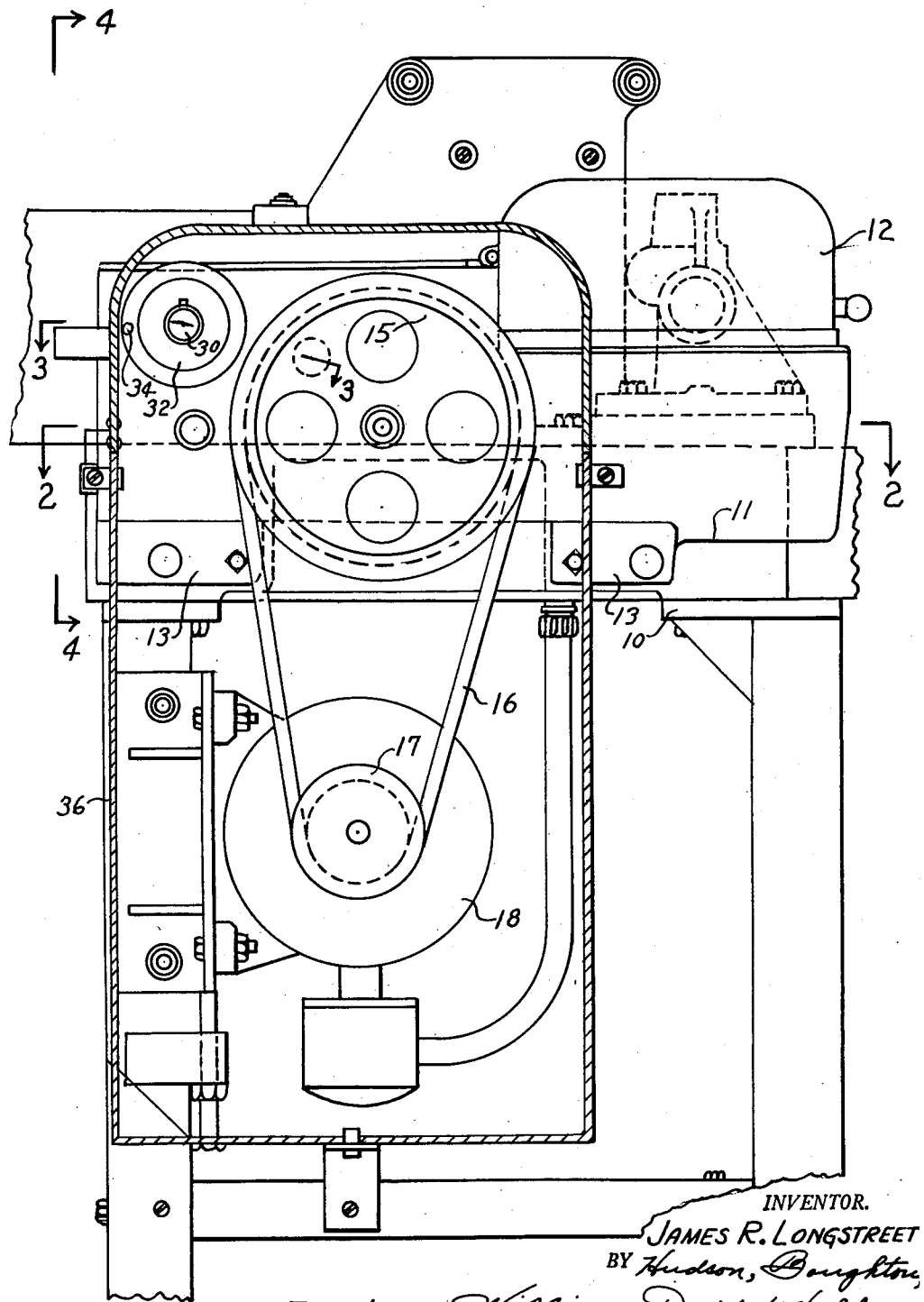
Figure 5:
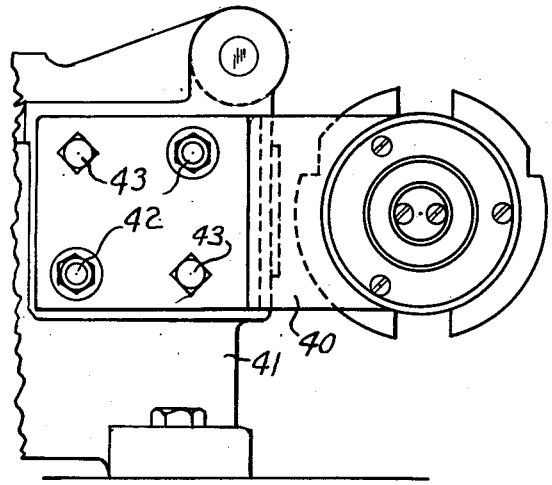

Fig. 4 is a view of the gill box looking in the direction of the arrows of line 4—4 of Fig. 1 and shows the side frames of the faller bar section of the gill box and also is a partial vertical transverse section and a partial end elevational view of the faller bar section with the cross shaft shown in full lines but with a portion thereof broken away, and Fig. 5 is a fragmentary side elevational view looking from the left hand side of Fig. 4 and showing the hanger bracket that is connected to the side frame of the faller bar section and which forms part of the supporting means for the cross shaft.

The gill box as is well understood in the art comprises a table or platen 10 supported by suitable legs and which table or platen supports the frame for the faller bar section as will later be referred to.

The present invention contemplates providing a unit which is secured to the platen or table partly on the top of the latter and partly to one side of the latter. This unit includes a gear box mounting the gear drive train from the upper belt driven pulley to the cross shaft extension shaft and which has therein a shear coupling located exteriorly of the gear box and which extension shaft can be readily coupled and uncoupled to the cross shaft of the faller bar section of the gill box. In other words, the entire unit of the gear box and the elements referred to as mounted therein or carried thereby can be manufactured and assembled and applied to and secured in position on the platen or table as a unit and with the shear coupling readily accessible on the exterior of the unit.

Figure 2:
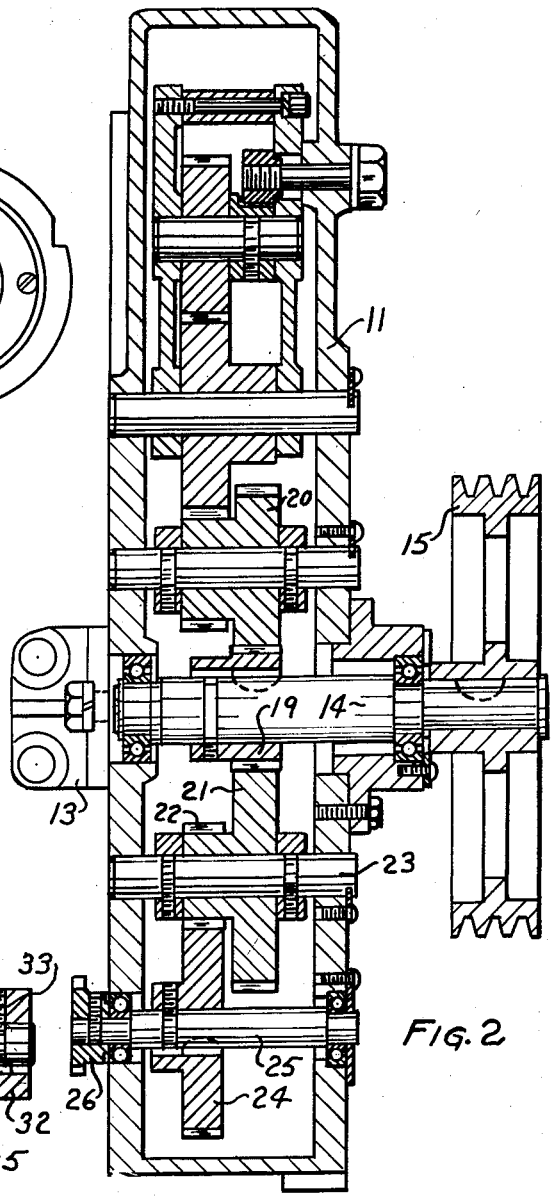
Fig. 2 is a horizontal sectional view through the unit containing the gear drive train and is taken substantially on the plane of line 2—2 of Fig. 1 looking in the direction of the arrows.
Figure 3:
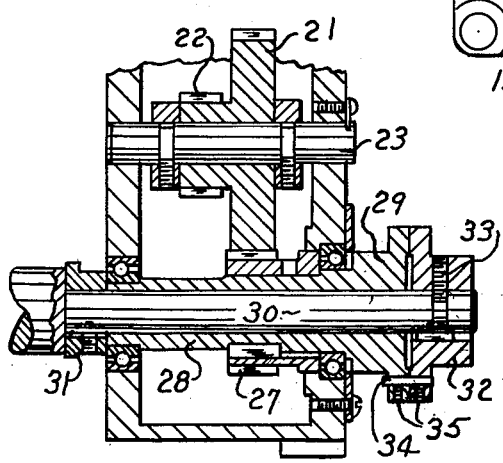
Fig. 3 is a fragmentary horizontal sectional view through the unit containing the gear drive train and is taken substantially along the line 3—3 of Fig. 1 looking in the direction of the arrows and above the plane of Fig. 2 and shows the cross shaft extension shaft of the unit and also the shear coupling located exteriorly of the unit.

The gear box is shown in side elevation in Fig. 1 and in section in Figs. 2 and 3 and is indicated at 11 and has a hinged cover 12 for a portion of the top of the gear box. The gear box 11 is provided with suitable brackets 13 enabling it to be secured to the top and side of the platen or table of the gill box by suitable securing bolts and locating pins passing through the brackets and into the table or platen.

The gear box 11 rotatably mounts in suitable bearings a drive shaft 14 which extends outwardly of the outer side of the gear box and has fixed to it the multiple V-belt drive pulley 15 which is driven by V-belts 16 passing around a smaller pulley 17 fixed on the shaft of the drive motor 18. The drive motor 18 is supported by suitable means secured to the legs of the gill box and located below the platen 10 as will be well understood in the art.

The drive shaft 14 has fixed to it within the gear box 10 a gear 19 which meshes with gears of two divergent gear trains in the gear box. The first gear train, as indicated in Fig. 2, includes the gear 20 that meshes with the gear 19 but inasmuch as said first gear train extends to certain operative parts of the gill box which form no part of the present invention further reference herein to this first gear train is unnecessary.

The second gear train in the gear box 11 includes a two gear cluster formed of a gear 21 constantly meshing with the gear 19 on the drive shaft 14 and a smaller gear 22. The gear cluster formed by the gears 21 and 22 is rotatable on a fixed supporting shaft 23 mounted in the walls of the gear box and provided with collars fixed thereto to hold the gear cluster against axial displacement. The small gear 22 of the cluster meshes with a gear 24 fixed to a shaft 25 rotatably supported in suitable bearings in the walls of the gear box with said shaft 25 extending outwardly of one side wall of the gear box and having fixed thereto a sprocket 26 forming part of a chain and sprocket drive to the creel which supports and feeds the slivers passing through the gill box but which is not shown herein as it forms no part of the present invention.

The large gear 21 of the two gear cluster meshes with a gear 27 fixed to a sleeve 28 rotatably mounted in suitable bearings supported in the walls of the gear box (see Fig. 3) and located in a horizontal plane above the horizontal plane of Fig. 2. The sleeve 28 extends outwardly of the outer side wall of the gear box, i. e., the right hand wall thereof as viewed in Fig. 3, and has formed on its extended end an enlarged flange portion 29. A shaft 30 which is the extension shaft for the cross shaft of the faller bar section later to be referred to has a reduced portion rotatable in the sleeve 28 and extending outwardly beyond the enlarged flange portion 29 thereof. The reduced portion of the shaft 30 also extends outwardly of the inner wall of the gear box i. e., the left hand wall as viewed in Fig. 3 and has fixed to it a spacing collar 31 interposed between said left hand wall of the gear box and the large portion of the shaft 30.

The reduced portion of the shaft 30 which extends beyond the flange portion 29 of the sleeve 28 mounts a flanged collar 32 which is keyed to the shaft 30 as well as fixed thereto by a screw pin 33. The flange of the collar 32 abuts the flange of the portion 29 of the sleeve 28 and the abutting flanges are provided with aligned openings into which is positioned a shear pin 34 and which pin is held in the aligned openings by separate setscrews 35 located in each of the flanges.

It will be understood that the shear pin 34 operatively interconnects the sleeve 28 with the collar 32 and shaft 30 and that said pin will be formed of a suitable material such that an overload on the shaft 30 will cause the pin 34 to shear or break and interrupt the drive from the sleeve 28 to the shaft 30 and thereby avoid damaging other parts of the drive to the faller bars in the event of overload.

It will be recalled that the shear coupling between the flanged portion 29 of the sleeve 28 and the flanged collar 32 is located outside of the outer wall of the gear box 11 and in a position readily accessible to the operator merely by opening or removing the covering 36 provided for the motor 18 and the belt and pulleys driven thereby. In case the shear pin 24 is sheared then when the cause of the overload has been overcome the operator can remove the sheared parts of the former shear pin and insert and secure a new shear pin in operative position.

It has been stated that the shaft 30 forming part of the unitary structure mounted in or carried by the gear box 11 constitutes an extension of the cross shaft 37 of the faller bar section of the gill box. The extension shaft 30 and the cross shaft 37 are coupled together by a suitable flexible coupling means indicated at 38 and which may be of known construction.

It will thus be seen that the gear box 11 and the drive train and shafts mounted in or supported by the box can be removed from the machine as a unit after uncoupling the flexible coupling 38 between the extension shaft 30 and the cross shaft 37.

The cross shaft 37 is rotatably supported in hanger brackets 39 and 40 secured to the side frames 41 of the faller bar section of the gill box. The hanger brackets 39 and 40 can be readily secured to the side frames 41 by suitable securing means such as the nuts and bolts indicated at 42, see Fig. 5, and locating and positioning pins 43, wherefore the supports for the cross shaft 37 can be accurately located.

It will be understood that the hanger brackets 39 and 40 are substantially identical and are secured to the side frames 41 in the same manner but with the lower end of the bracket 40 spaced a greater distance from its adjacent side frame 41 than is the lower end of the bracket 39 so that an adjustable driving coupling or connection between the left-hand end of the shaft 37 and the driven members of the faller bar section can be accommodated between the bracket 40 and the side frame 41.

This adjustable coupling or connection may take the form shown in Denton Patent 2,621,370, December 16, 1952. As shown in said Patent 2,621,370 it will be understood that the cross shaft 37 has fixed thereto adjacent each of the side frames 41 bevel gears 44 which drive the gearing at each side of the faller bar section and which gearing operates the screws that move the faller bars.

It is not believed necessary to further describe the gearing to the faller bar moving screws as the same is fully described in said Patent 2,621,370 and is well known in the art.

It will be noted that the hanger brackets 39 and 40 and the cross shaft 37 form part of the faller bar section unit of the gill box as distinguished from previous arrangements within the cross shaft is supported by means extending from the platen or table of the gill box and which does not constitute a part of the faller bar section. Consequently the faller bar section of the gill box can be produced as a unit and will include the hanger bracket and the cross shaft mounted therein and this will greatly facilitate the manufacture and assembly of the different units of the gill box.

Likewise, as previously pointed out, the gear box and the gearing and shafting contained therein including the extension shaft for the cross shaft and the shear coupling located exteriorly of the outerside of the gear box constitute a unit which can be separately manufactured and assembled and then assembled onto the gill box platen or table, and with the coupling between the extension shaft 30 and the cross shaft 37 providing the driving relation between the gear box unit and the faller bar section unit.

The flexible coupling 38 between the cross shaft 37 and the extension shaft 30 assists in absorbing shocks and vibrations during the operation of the machine and thus reduces wear on the parts and obviates likelihood of breakage therein.

Although a preferred embodiment of the invention has been illustrated and described herein it will be understood that the invention is susceptible of various modifications and adaptations within the scope of the appended claims.

Having thus described my invention, I claim:

1. In a gill box having a supporting platen or table, a gear box secured to said platen or table at one side of the gill box and rotatably supporting a drive shaft extending outwardly of the outer side of the gear box and adapted to be operatively connected to the drive motor for the gill box, said gear box mounting a gear drive train extending from said drive shaft to an extension shaft supported by the gear box and projecting beyond the inner wall of the gear box and adapted to be operatively connected to the cross shaft of the faller bar section of the gill box.

2. A gill box as defined in claim 1 and wherein the gear drive train from the drive shaft to the extension shaft includes a shear coupling operatively connecting said gear drive train with said extension shaft and located exteriorly of the outer wall of the gear box.

3. In a gill box as defined in claim 1 and wherein the gear drive train from the drive shaft to the extension shaft includes a sleeve rotatably supported by said gear box and surrounding said extension shaft and rotatable relative thereto and extending outwardly of the outer wall of the gear box, and a shear coupling interconnecting said sleeve and said extension shaft exteriorly of said outer wall.

4. In a gill box as defined in claim 1 and wherein the operative drive train in the gear box intermediate the drive and extension shafts includes a sleeve rotatably supported in the inner and outer walls of the gear box and projecting outwardly beyond the outer wall thereof and provided with a flanged portion on its outwardly projecting end, said extension shaft being rotatable in said sleeve and projecting beyond the flanged portion of said sleeve, a flanged collar fixed to the projecting end of the extension shaft with its flange engaging the flange of the flanged portion of said sleeve, said engaging flanges being provided with aligned openings, a shear pin mounted in said openings, and means carried by each flange securing said shear pin in the respective opening.

5. In a gill box having a supporting platen or table and side frame members for the faller bar section of the gill box; a unit secured to the platen or table at one side of the gill box and including a housing rotatably supporting a drive shaft adapted to be connected to the drive motor for the gill box and extending outwardly of the outer side of the housing, an extension shaft rotatably supported by said housing and extending outwardly of the inner side of the housing, a gear drive train interconnecting said shafts; said faller bar section constituting a unit including said side frames, hanger brackets secured thereto, and a cross shaft for the faller bar section rotatably mounted in said brackets, said cross shaft and said extension shaft being operatively coupled together.

6. In a gill box as defined in claim 5 and wherein the drive train connection between said drive and extension shafts of said first named unit includes a shear coupling between said extension shaft and the remainder of the drive train and located exteriorly of the outer side of the housing.

7. In a gill box as defined in claim 5 and wherein the drive train in said first unit includes a sleeve rotatable in said housing and projecting outwardly of the outer wall of said housing, while said extension shaft is rotatable within said sleeve and projects outwardly of the opposite ends thereof, a shear coupling being provided between said sleeve and said extension shaft outwardly of the outer side of said housing.

8. In a gill box as defined in claim 5 and wherein said cross shaft and said extension shaft are operatively coupled together by a flexible coupling.

References Cited in the file of this patent
UNITED STATES PATENTS

| | | |
|---|---|---|
| 2,307,556 | Wileman | Jan. 5, 1943 |
| 2,621,370 | Denton | Dec. 16, 1952 |